US012676139B1

(12) United States Patent
Smith

(10) Patent No.: US 12,676,139 B1
(45) Date of Patent: Jul. 7, 2026

(54) MIXED REALITY TEXT NARRATION WITH DYNAMIC TEXT DETECTION

(71) Applicant: Meta Platforms Technologies, LLC, Menlo Park, CA (US)

(72) Inventor: Benjamin Joseph Smith, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/071,469

(22) Filed: Mar. 5, 2025

(51) Int. Cl.
| | |
|---|---|
| *G10L 13/033* | (2013.01) |
| *G06F 3/01* | (2006.01) |
| *G06T 19/00* | (2011.01) |
| *G06V 20/20* | (2022.01) |
| *G06V 20/62* | (2022.01) |

(52) U.S. Cl.
CPC ............ *G10L 13/033* (2013.01); *G06F 3/013* (2013.01); *G06F 3/017* (2013.01); *G06T 19/006* (2013.01); *G06V 20/20* (2022.01); *G06V 20/63* (2022.01)

(58) Field of Classification Search
CPC ....... G10L 13/033; G06F 3/013; G06F 3/017; G06T 19/006; G06V 20/20; G06V 20/63
See application file for complete search history.

(56) References Cited

U.S. PATENT DOCUMENTS

| | | | | | |
|---|---|---|---|---|---|
| 6,892,352 | B1 * | 5/2005 | Myers | ................. | G06F 16/9577 |
| | | | | | 707/E17.121 |
| 9,317,486 | B1 * | 4/2016 | Story, Jr. | ............... | G06F 3/0425 |

| | | | | | |
|---|---|---|---|---|---|
| 9,472,113 | B1 * | 10/2016 | Hwang | ................. | G09B 5/062 |
| 10,805,665 | B1 * | 10/2020 | Sangoli | .............. | H04N 21/4307 |
| 10,957,304 | B1 * | 3/2021 | Krein | .................... | G06F 40/253 |
| 11,429,839 | B2 * | 8/2022 | Buesser | ................ | G06F 16/735 |
| 11,709,653 | B1 * | 7/2023 | Shin | ........................ | G06F 16/685 |
| | | | | | 345/156 |
| 11,720,556 | B1 * | 8/2023 | Parampottil | ........ | H04M 3/5307 |
| | | | | | 707/769 |
| 11,861,801 | B2 * | 1/2024 | Gurgul | .................... | G06F 3/017 |
| 12,307,012 | B2 * | 5/2025 | Olwal | ..................... | G06F 3/013 |
| 2001/0056342 | A1 * | 12/2001 | Piehn | ................. | H04N 1/00488 |
| | | | | | 704/277 |
| 2006/0277052 | A1 * | 12/2006 | He | .......................... | G10L 21/04 |
| | | | | | 704/503 |
| 2011/0191368 | A1 * | 8/2011 | Muzatko | ................. | G06F 3/048 |
| | | | | | 715/776 |
| 2011/0288861 | A1 * | 11/2011 | Kurzweil | .............. | G09B 5/062 |
| | | | | | 704/E15.044 |

(Continued)

*Primary Examiner* — William Lu
(74) *Attorney, Agent, or Firm* — Morgan, Lewis & Bockius LLP

(57) ABSTRACT

An embodiment includes receiving, via a video camera of a mixed reality headset, a first video frame comprising a first text portion. An embodiment includes narrating the first text portion, the narrating comprising converting, using a trained text-to-speech conversion model, the first text portion to corresponding audio. An embodiment includes detecting, in a second video frame received via the video camera, during the narrating, that the first text portion has been replaced by a second text portion. An embodiment includes adjusting, responsive to the detecting, the narrating, the adjusting comprising ceasing the narrating at a first word in the first text portion and starting the narrating at a second word in the second text portion.

18 Claims, 8 Drawing Sheets

(56) References Cited

U.S. PATENT DOCUMENTS

| | | | | |
|---|---|---|---|---|
| 2011/0313899 A1* | 12/2011 | Drey | ...................... | G06Q 40/12 |
| | | | | 715/205 |
| 2011/0314381 A1* | 12/2011 | Fuller | ..................... | A63F 13/45 |
| | | | | 715/730 |
| 2013/0130216 A1* | 5/2013 | Morton | .................. | G09B 5/062 |
| | | | | 434/317 |
| 2013/0174205 A1* | 7/2013 | Jacobsen | ................. | G06F 3/011 |
| | | | | 725/81 |
| 2013/0246063 A1* | 9/2013 | Teller | ................... | G10L 13/033 |
| | | | | 704/235 |
| 2013/0307855 A1* | 11/2013 | Lamb | ..................... | G06F 3/013 |
| | | | | 345/473 |
| 2013/0321390 A1* | 12/2013 | Latta | .................... | G06T 19/006 |
| | | | | 704/E21.001 |
| 2014/0111542 A1* | 4/2014 | Wan | ....................... | G06V 20/20 |
| | | | | 345/633 |
| 2017/0092322 A1* | 3/2017 | Kamhi | ................. | G11B 27/036 |
| 2017/0186243 A1* | 6/2017 | Shi | ............................ | G06T 3/40 |
| 2017/0277257 A1* | 9/2017 | Ota | ....................... | G02B 27/017 |
| 2019/0078900 A1* | 3/2019 | Carter | .................. | G01C 21/362 |
| 2019/0206132 A1* | 7/2019 | Zielkowski | ............ | G06F 3/011 |
| 2020/0027439 A1* | 1/2020 | Lee | .................... | G06V 30/1463 |
| 2020/0134037 A1* | 4/2020 | Mankovskii | ........... | G06F 40/44 |
| 2020/0285442 A1* | 9/2020 | Fallon | ..................... | G09G 5/00 |
| 2020/0320770 A1* | 10/2020 | Charlson | ............... | G06Q 50/26 |
| 2020/0357183 A1* | 11/2020 | Weber | ..................... | G06F 3/013 |
| 2023/0171456 A1* | 6/2023 | Sharma | .................. | G06T 11/00 |
| | | | | 725/38 |
| 2024/0185887 A1* | 6/2024 | Werner | ............. | H04N 21/4532 |
| 2024/0211477 A1* | 6/2024 | Gampa | ............... | G06F 16/3329 |
| 2024/0233571 A1* | 7/2024 | Pollack | ............... | G09B 17/006 |
| 2024/0241622 A1* | 7/2024 | Mejia Velez | ......... | G06F 3/0484 |
| 2024/0386716 A1* | 11/2024 | Lettiere | ................ | G06F 3/0488 |
| 2025/0118286 A1* | 4/2025 | Badlani | ................. | G10L 13/047 |

* cited by examiner

Video Image
600

Process
800

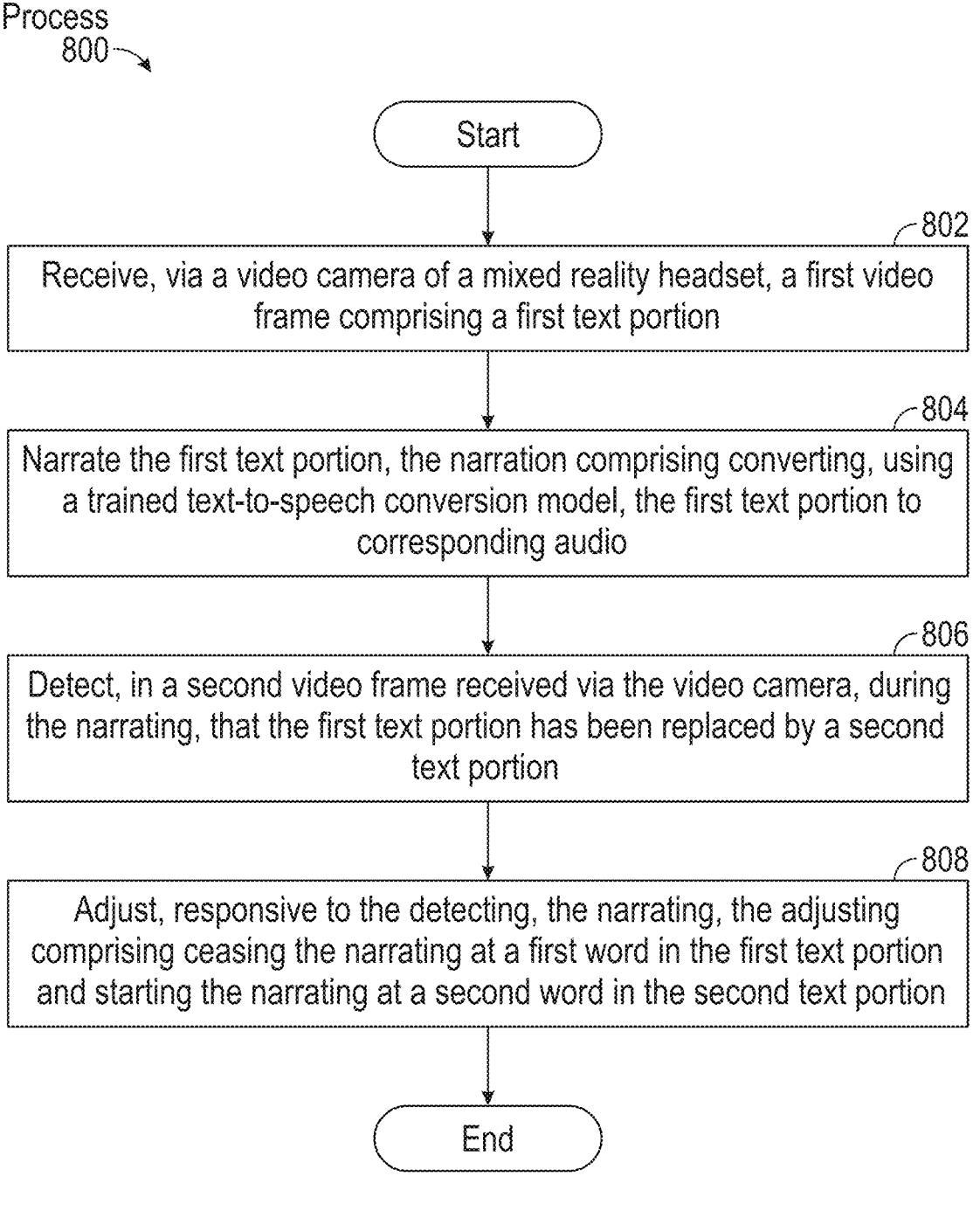

Start

802

Receive, via a video camera of a mixed reality headset, a first video frame comprising a first text portion

804

Narrate the first text portion, the narration comprising converting, using a trained text-to-speech conversion model, the first text portion to corresponding audio

806

Detect, in a second video frame received via the video camera, during the narrating, that the first text portion has been replaced by a second text portion

808

Adjust, responsive to the detecting, the narrating, the adjusting comprising ceasing the narrating at a first word in the first text portion and starting the narrating at a second word in the second text portion End

FIG. 8

MIXED REALITY TEXT NARRATION WITH DYNAMIC TEXT DETECTION

TECHNICAL FIELD

The present disclosure generally relates to a mixed reality environment, and more particularly to mixed reality text narration control.

BACKGROUND

The term "mixed reality" or "MR" as used herein refers to a form of reality that has been adjusted in some manner before presentation to a user, which may include, e.g., virtual reality (VR), augmented reality (AR), extended reality (XR), hybrid reality, or some combination and/or derivatives thereof. Mixed reality content may include completely generated content or generated content combined with captured content (e.g., real-world photographs). The mixed reality content may include video, audio, haptic feedback, or some combination thereof, any of which may be presented in a single channel or in multiple channels (such as stereo video that produces a three-dimensional (3D) effect to the viewer). Additionally, in some embodiments, mixed reality may be associated with applications, products, accessories, services, or some combination thereof, that are, e.g., used to interact with content in an immersive application. The mixed reality system that provides the mixed reality content may be implemented on various platforms, including a head-mounted display (HMD) connected to a server, a host computer system, a standalone HMD, a mobile device or computing system, a "cave" environment or other projection system, or any other hardware platform capable of providing mixed reality content to one or more viewers. Mixed reality may be equivalently referred to herein as "artificial reality."

"Virtual reality" or "VR," as used herein, refers to an immersive experience where a user's visual input is controlled by a computing system. "Augmented reality" or "AR" as used herein refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. AR also refers to systems where light entering a user's eye is partially generated by a computing system and partially composes light reflected off objects in the real world. For example, an AR headset could be shaped as a pair of glasses with a pass-through display, which allows light from the real world to pass through a waveguide that simultaneously emits light from a projector in the AR headset, allowing the AR headset to present virtual objects intermixed with the real objects the user can see. The AR headset may be a block-light headset with video pass-through. "Mixed reality" or "MR," as used herein, refers to any of VR, AR, XR, or any combination or hybrid thereof.

One use case for MR technology is audio narration of text seen through an MR headset or on a screen of a user's computing device. Text to be narrated can be physical (e.g., on paper) or virtual (e.g., an e-book). For example, some users have a vision or text processing impairment that makes it difficult or impossible to read text and some users prefer to consume text in audiobook form. However, audiobooks are not available for many documents, especially older publications and those directed to a specialized audience. In addition, some users prefer to have text and corresponding audio available together, for example to view the text in a magnified form, reference illustrations, take notes, or highlight portions of the text. When implementing mixed reality text narration, there is a need to control the narration, preferably using a capability of the device providing the narration.

SUMMARY

Some embodiments of the present disclosure provide a computer-implemented method for mixed reality text narration control. The method includes receiving, via a video camera of a mixed reality headset, a first video frame comprising a first text portion; narrating the first text portion, the narrating comprising converting, using a trained text-to-speech conversion model, the first text portion to corresponding audio; detecting, in a second video frame received via the video camera, during the narrating, that the first text portion has been replaced by a second text portion; and adjusting, responsive to the detecting, the narrating, the adjusting comprising ceasing the narrating at a first word in the first text portion and starting the narrating at a second word in the second text portion.

Some embodiments of the present disclosure provide a non-transitory computer-readable medium storing a program for mixed reality text narration control. The program, when executed by a computer, configures the computer to receive, via a video camera of a mixed reality headset, a first video frame comprising a first text portion; narrate the first text portion, the narrating comprising converting, using a trained text-to-speech conversion model, the first text portion to corresponding audio; detect, in a second video frame received via the video camera, during the narrating, that the first text portion has been replaced by a second text portion; and adjust, responsive to the detecting, the narrating, the adjusting comprising ceasing the narrating at a first word in the first text portion and starting the narrating at a second word in the second text portion.

Some embodiments of the present disclosure provide a system for mixed reality text narration control. The system comprises a processor and a non-transitory computer readable medium storing a set of instructions, which when executed by the processor, configure the processor to receive, via a video camera of a mixed reality headset, a first video frame comprising a first text portion; narrate the first text portion, the narrating comprising converting, using a trained text-to-speech conversion model, the first text portion to corresponding audio; detect, in a second video frame received via the video camera, during the narrating, that the first text portion has been replaced by a second text portion; and adjust, responsive to the detecting, the narrating, the adjusting comprising ceasing the narrating at a first word in the first text portion and starting the narrating at a second word in the second text portion.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 8 depicts a flowchart of an example process for mixed reality text narration control. in accordance with an illustrative embodiment.

Figure 1:
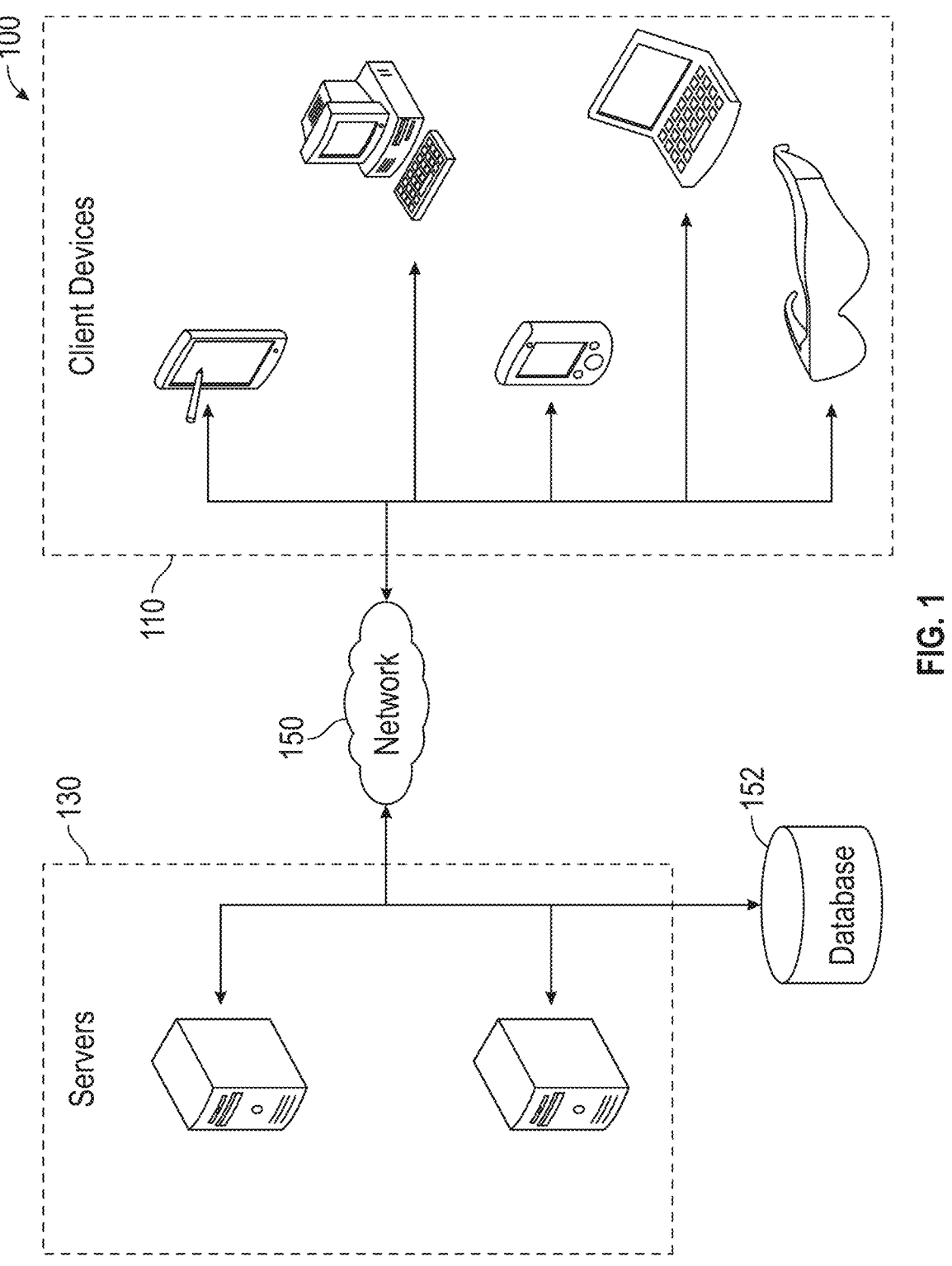
FIG. 1 illustrates a network architecture used to implement mixed reality text narration control, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Embodiments of the present disclosure address the above identified problems by implementing mixed reality text narration control. In particular, an embodiment receives, via a video camera of a mixed reality headset, a first video frame comprising a first text portion; narrates the first text portion, the narration comprising converting, using a trained text-to-speech conversion model, the first text portion to corresponding audio; detects, in a second video frame received via the video camera, during the narrating, that the first text portion has been replaced by a second text portion; and adjusts, responsive to the detecting, the narrating, the adjustment comprising ceasing the narrating at a first word in the first text portion and starting the narrating at a second word in the second text portion.

An embodiment receives a video stream, including individual frames, via a video camera. In some embodiments, the video camera is coupled to a mixed reality headset, for example AR glasses or a VR headset with a passthrough capability, to capture a user's physical environment.

An embodiment detects a text portion in a frame of the video stream and begins narrating the detected text portion. Narrating the text portion includes converting, using a trained text-to-speech conversion model, the text portion to corresponding audio. In some embodiments, narrating the text portion includes translating the text portion from one human language to another and converting, using the trained text-to-speech conversion model, the translated text to corresponding audio. In some embodiments, narration is triggered by detecting a predefined user input, such as a hand gesture (e.g., pointing to the text), audio input (e.g., "read to me"), eye movement (e.g., blinking twice within a predefined period of time), or selecting a user interface element or a subset of the portion of text with a user input device such as touchpad. In other embodiments, narration is triggered by detecting the presence of the text portion, without an additional user input. In embodiments, narration begins at an indicated location, if one is available (e.g., at the location within the text that the user points to) or at a default location (e.g., where narration was previously paused, or the top left of the text (for languages that are written left-to-right and top-to-bottom), or at the location corresponding to the largest font size in the text). An embodiment performs user input detection using a sensor communicating with a device on which an embodiment executes and a presently available technique to detect and interpret input from the sensor. For example, some MR headsets include one or more gesture sensors or cameras to detect and track a user's hand or eye movements. As another example, some MR headsets include a microphone for detecting audio input and use a presently available trained speech recognition model to interpret detected audio input as a command.

During the narration, an embodiment detects, in a video frame received via the video camera, that the text portion currently being narrated has been replaced by a new text portion. For example, a user holding a physical book being narrated might have turned to a different page in the book. Responsive to detecting that the text portion currently being narrated has been replaced by a second text portion, an embodiment adjusts the narration by ceasing the narrating at a first word in the original text portion and starting the narrating at a word in the new text portion. One embodiment adjusts the narration responsive to detecting that the new text portion has been in view of the video camera for at least a predetermined period of time, to accommodate a situation where the user is flipping through the book too rapidly to select a logical location to resume narrating from.

During the narration, an embodiment detects, in a video frame received via the video camera, that the text portion currently being narrated is absent from the video frame, for example because the user has closed the book being narrated or is looking at something other than the book. In response, an embodiment pauses the narration. One embodiment stores the location at which narration stopped for possible later resumption.

During the narration, an embodiment detects a gesture indicating a word in the text portion currently being narrated. In response, an embodiment interprets the gesture (e.g., a finger pointing at a word) as a command to skip to the indicated word and adjusts the narration by ceasing narration at a different word in the text portion and restarting the narration at the indicated word. In response, another embodiment interprets the gesture (e.g., a thumb and finger of one or both hands of a user encompassing a portion of text) as a command to highlight the indicated text and adjusts an appearance of the indicated text in a display of the text portion being narrated. One embodiment stores the highlighted location for the user's later reference.

During the narration, an embodiment detects, using a sensor of an MR headset, an eye gaze location indicating a word in the text portion currently being narrated. In response, an embodiment interprets the detected eye gaze location as a command to skip to the indicated word and adjusts the narration by ceasing narration at a different word in the text portion and restarting the narration at the indicated word.

During the narration, an embodiment detects a gesture indicating a page turning operation and, in response, adjusts the narration by ceasing the narrating at a current location and starting the narrating at a word in a now-visible text portion. During the narration, an embodiment detects a gesture indicating a narration speed adjustment and, in response, adjusts narration speed accordingly. During the narration, an embodiment detects a gesture indicating a narration location adjustment (e.g., forwards or backwards by a word, sentence, page, chapter, and the like) and, in response, adjusts the narration location accordingly.

During the narration, an embodiment detects, using a sensor of an MR headset, an audio input, uses a trained speech recognition model or another presently available technique to recognize the audio input as a voice command, and adjusts the narration responsive to the detected voice command. Some non-limiting examples of a voice command are "go to next chapter", "pause narration", "repeat last sentence", "magnify text 50%", and the like. If the voice command requires a response (e.g., "how many more pages in this chapter") an embodiment uses one or more presently available computing and text-to-speech techniques to generate and play the response, then resumes the narration if appropriate to the detected voice command. Other narration control gestures, audio inputs, pointing device inputs, and text inputs, along with corresponding responses, are also possible and contemplated within the scope of the illustrative embodiments.

FIG. 1 illustrates a network architecture 100 used to implement mixed reality text narration control, according to some embodiments. The network architecture 100 may include one or more client devices 110 and servers 130, communicatively coupled via a network 150 with each other and to at least one database 152. Database 152 may store data and files associated with the servers 130 and/or the client devices 110. In some embodiments, client devices 110 collect data, video, images, and the like, for upload to the servers 130 to store in the database 152.

The network 150 may include a wired network (e.g., fiber optics, copper wire, telephone lines, and the like) and/or a wireless network (e.g., a satellite network, a cellular network, a radiofrequency (RF) network, Wi-Fi, Bluetooth, and the like). The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

Client devices 110 may include, but are not limited to, laptop computers, desktop computers, and mobile devices such as smart phones, tablets, televisions, wearable devices, head-mounted devices, display devices, and the like.

In some embodiments, the servers 130 may be a cloud server or a group of cloud servers. In other embodiments, some or all of the servers 130 may not be cloud-based servers (i.e., may be implemented outside of a cloud computing environment, including but not limited to an on-premises environment), or may be partially cloud-based. Some or all of the servers 130 may be part of a cloud computing server, including but not limited to rack-mounted computing devices and panels. Such panels may include but are not limited to processing boards, switchboards, routers, and other network devices. In some embodiments, the servers 130 may include the client devices 110 as well, such that they are peers.

Figure 2:
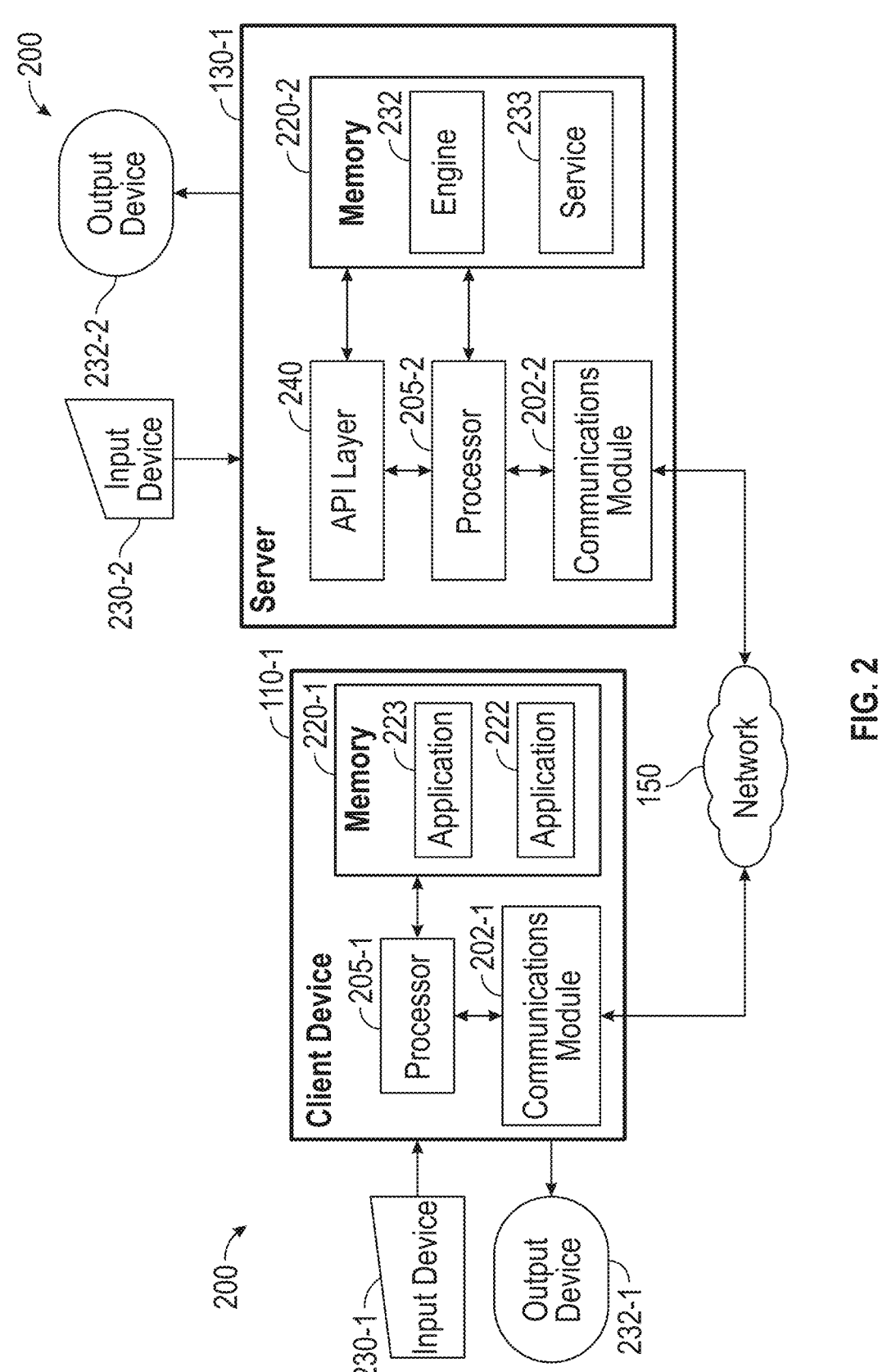
FIG. 2 is a block diagram illustrating details of a system for mixed reality text narration control, according to some embodiments.

FIG. 2 is a block diagram illustrating details of a system 200 for mixed reality text narration control, according to some embodiments. Specifically, the example of FIG. 2 illustrates an exemplary client device 110-1 (of the client devices 110) and an exemplary server 130-1 (of the servers 130) in the network architecture 100 of FIG. 1.

Client device 110-1 and server 130-1 are communicatively coupled over network 150 via respective communications modules 202-1 and 202-2 (hereinafter, collectively referred to as "communications modules 202"). Communications modules 202 are configured to interface with network 150 to send and receive information, such as requests, data, messages, commands, and the like, to other devices on the network 150. Communications modules 202 can be, for example, modems or Ethernet cards, and/or may include radio hardware and software for wireless communications (e.g., via electromagnetic radiation, such as radiofrequency (RF), near field communications (NFC), Wi-Fi, and Bluetooth radio technology).

The client device 110-1 and server 130-1 also include a processor 205-1, 205-2 and memory 220-1, 220-2, respectively. Processors 205-1 and 205-2, and memories 220-1 and 220-2 will be collectively referred to, hereinafter, as "processors 205," and "memories 220." Processors 205 may be configured to execute instructions stored in memories 220, to cause client device 110-1 and/or server 130-1 to perform methods and operations consistent with embodiments of the present disclosure.

The client device 110-1 and the server 130-1 are each coupled to at least one input device 230-1 and input device 230-2, respectively (hereinafter, collectively referred to as "input devices 230"). The input devices 230 can include a mouse, a controller, a keyboard, a pointer, a stylus, a touchscreen, a microphone, voice recognition software, a joystick, a virtual joystick, a touch-screen display, and the like. In some embodiments, the input devices 230 may include cameras, microphones, sensors, and the like. In some embodiments, the sensors may include touch sensors, acoustic sensors, inertial motion units and the like.

The client device 110-1 and the server 130-1 are also coupled to at least one output device 232-1 and output device 232-2, respectively (hereinafter, collectively referred to as "output devices 232"). The output devices 232 may include a screen, a display (e.g., a same touchscreen display used as an input device), a speaker, an alarm, and the like. A user may interact with client device 110-1 and/or server 130-1 via the input devices 230 and the output devices 232.

Memory 220-1 may further include an application 222, configured to execute on client device 110-1 and couple with input device 230-1 and output device 232-1, and implement mixed reality text narration control. The application 222 may be downloaded by the user from server 130-1, and/or may be hosted by server 130-1. The application 222 may include specific instructions which, when executed by processor 205-1, cause operations to be performed consistent with embodiments of the present disclosure. In some embodiments, the application 222 runs on an operating system (OS) installed in client device 110-1. In some embodiments, application 222 may run within a web browser. In some embodiments, the processor 205-1 is configured to control a graphical user interface (GUI) (e.g., spanning at least a portion of input devices 230 and output devices 232) for the user of client device 110-1 to access the server 130-1.

In some embodiments, memory 220-2 includes an application engine 232. The application engine 232 may be configured to perform methods and operations consistent with embodiments of the present disclosure. The application engine 232 may share or provide features and resources with the client device 110-1, including data, libraries, and/or applications retrieved with application engine 232 (e.g., application 222). The user may access the application engine 232 through the application 222. The application 222 may be installed in client device 110-1 by the application engine 232 and/or may execute scripts, routines, programs, applications, and the like provided by the application engine 232.

Memory 220-1 may further include an application 223, configured to execute in client device 110-1. The application 223 may communicate with service 233 in memory 220-2 to provide mixed reality text narration control. The application 223 may communicate with service 233 through API layer 240, for example.

Figure 3:
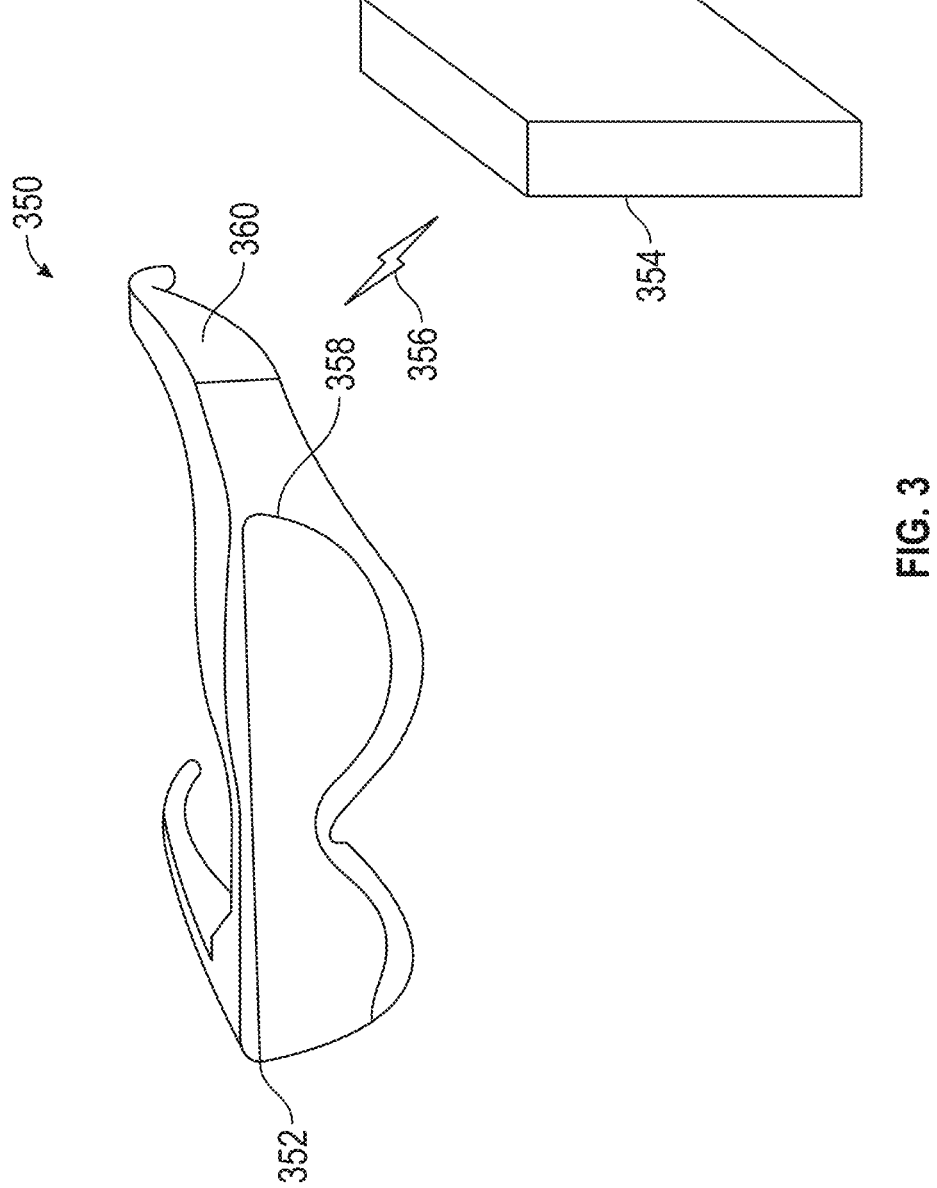
FIG. 3 illustrates a mixed reality HMD system which includes a mixed reality HMD and a core processing component for use in mixed reality text narration control, according to some embodiments.

FIG. 3 illustrates a mixed reality HMD system 350 which includes a mixed reality HMD 352 and a core processing component 354. The mixed reality HMD 352 and the core processing component 354 may communicate via a wireless connection (e.g., a 60 GHz link) as indicated by the link 356. In other implementations, the mixed reality system 350 includes a headset only, without an external compute device or includes other wired or wireless connections between the mixed reality HMD 352 and the core processing component 354. The mixed reality HMD 352 includes a pass-through display 358 and a frame 360. The frame 360 may house various electronic components (not shown) such as light projectors (e.g., LASERs, LEDs, etc.), still or video cameras, eye-tracking sensors, MEMS components, networking components, etc. The frame 360 or another part of the mixed reality HMD 352 may include an audio electronic component such as a speaker (not shown in FIG. 3). The speaker may output audio from various audio sources, such as a phone call, VOIP session, or other audio channel. The electronic components may be configured to implement audio switching based on user gaming or XR interactions.

The projectors may be coupled to the pass-through display 358, e.g., via optical elements, to display media to a user. The optical elements may include one or more waveguide assemblies, reflectors, lenses, mirrors, collimators, gratings, etc., for directing light from the projectors to a user's eye. Image data may be transmitted from the core processing component 354 via link 356 to HMD 352. Controllers in the HMD 352 may convert the image data into light pulses from the projectors, which may be transmitted via the optical elements as output light to the user's eye. The output light may mix with light that passes through the display 358, allowing the output light to present virtual objects that appear as if they exist in the real world.

Similarly to the HMD 300, the HMD system 350 may also include motion and position tracking units, cameras, light sources, etc., which allow the HMD system 350 to, e.g., track itself in 3DoF or 6DoF, track portions of the user (e.g., hands, feet, head, eyes, or other body parts), map virtual objects to appear as stationary as the HMD 352 moves, and have virtual objects react to gestures and other real-world objects. For example, the HMD system 350 may track the motion and position of the user's wrist movements as input gestures for performing XR navigation. As an example, the HMD system 350 may include a coordinate system to track the relative positions of various XR objects and elements in a shared artificial reality environment.

Figure 4:
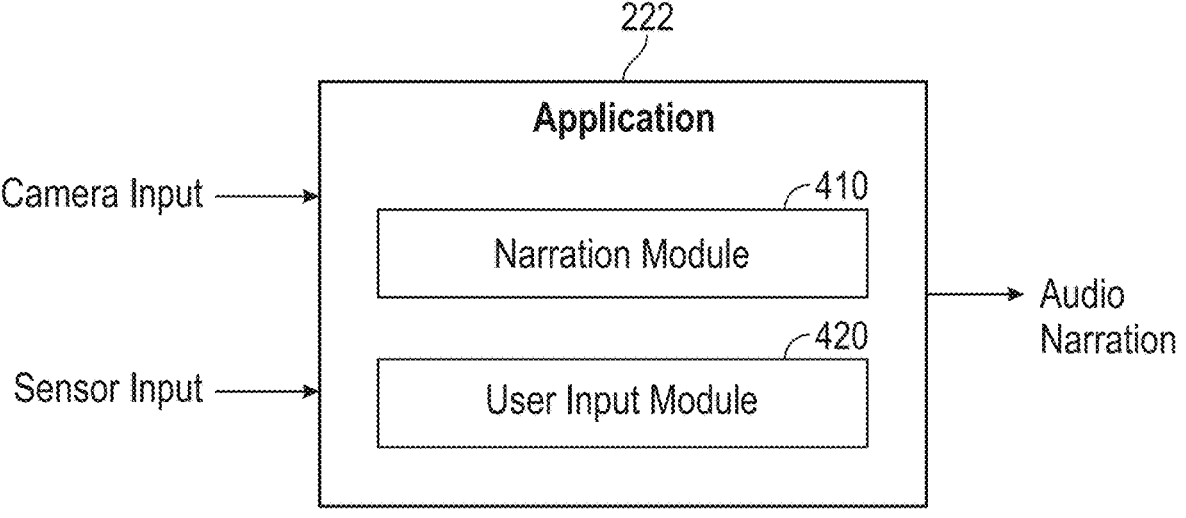
FIG. 4 depicts a block diagram of an example configuration for mixed reality text narration control, in accordance with an illustrative embodiment.

FIG. 4 depicts a block diagram of an example configuration for mixed reality text narration control, in accordance with an illustrative embodiment. Application 222 is the same as application 222 in FIG. 2.

Application 222 receives a video stream, including individual frames, via a video camera. In some implementations of application 222, the video camera is coupled to a mixed reality headset, for example mixed reality HMD 352 in FIG. 3, AR glasses or a VR headset with a passthrough capability, to capture a user's physical environment.

Narration module 410 detects a text portion in a frame of the video stream and begins narrating the detected text portion. Narrating the text portion includes converting, using a trained text-to-speech conversion model, the text portion to corresponding audio. In some implementations of module 410, narrating the text portion includes translating the text portion from one human language to another and converting, using the trained text-to-speech conversion model, the translated text to corresponding audio. In some implementations of module 410, narration is triggered by detecting a predefined user input, such as a hand gesture (e.g., pointing to the text), audio input (e.g., "read to me"), eye movement (e.g., blinking twice within a predefined period of time), or selecting a user interface element or a subset of the portion of text with a user input device such as touchpad. In other implementations of module 410, narration is triggered by detecting the presence of the text portion, without an additional user input. In implementations of module 410, narration begins at an indicated location, if one is available (e.g., at the location within the text that the user points to) or at a default location (e.g., where narration was previously paused, or the top left of the text (for languages that are written left-to-right and top-to-bottom), or at the location corresponding to the largest font size in the text). User input module 420 performs user input detection using a sensor communicating with a device on which an embodiment executes and a presently available technique to detect and interpret input from the sensor. For example, some MR headsets include one or more gesture sensors or cameras to detect and track a user's hand or eye movements. As another example, some MR headsets include a microphone for detecting audio input and use a presently available trained speech recognition model to interpret detected audio input as a command.

During the narration, user input module 420 detects, in a video frame received via the video camera, that the text portion currently being narrated has been replaced by a new text portion. For example, a user holding a physical book being narrated might have turned to a different page in the book. Responsive to detecting that the text portion currently being narrated has been replaced by a second text portion, module 410 adjusts the narration by ceasing the narrating at a first word in the original text portion and starting the narrating at a word in the new text portion. One implementation of module 410 adjusts the narration responsive to detecting that the new text portion has been in view of the video camera for at least a predetermined period of time, to accommodate a situation where the user is flipping through the book too rapidly to select a logical location to resume narrating from.

During the narration, module 410 detects, in a video frame received via the video camera, that the text portion currently being narrated is absent from the video frame, for example because the user has closed the book being narrated or is looking at something other than the book. In response, module 410 pauses the narration. One embodiment stores the location at which narration stopped for possible later resumption.

During the narration, module 420 detects a gesture indicating a word in the text portion currently being narrated. In response, module 410 interprets the gesture (e.g., a finger pointing at a word) as a command to skip to the indicated word and adjusts the narration by ceasing narration at a different word in the text portion and restarting the narration at the indicated word. In response, another implementation of module 410 interprets the gesture (e.g., a thumb and finger of one or both hands of a user encompassing a portion of text) as a command to highlight the indicated text and adjusts an appearance of the indicated text in a display of the text portion being narrated. One embodiment stores the highlighted location for the user's later reference.

During the narration, module 420 detects, using a sensor of an MR headset, an eye gaze location indicating a word in the text portion currently being narrated. In response, module 410 interprets the detected eye gaze location as a command to skip to the indicated word and adjusts the narration by ceasing narration at a different word in the text portion and restarting the narration at the indicated word.

During the narration, module 420 detects a gesture indicating a page turning operation and, in response, module 410 adjusts the narration by ceasing the narrating at a current location and starting the narrating at a word in a now-visible text portion. During the narration, module 420 detects a gesture indicating a narration speed adjustment and, in response, module 410 adjusts narration speed accordingly. During the narration, module 420 detects a gesture indicating a narration location adjustment (e.g., forwards or backwards by a word, sentence, page, chapter, and the like) and, in response, module 410 adjusts the narration location accordingly.

During the narration, module 420 detects, using a sensor of an MR headset, an audio input, uses a trained speech recognition model or another presently available technique to recognize the audio input as a voice command, and module 410 adjusts the narration responsive to the detected voice command. Some non-limiting examples of a voice command are "go to next chapter", "pause narration", "repeat last sentence", "magnify text 50%", and the like. If the voice command requires a response (e.g., "how many more pages in this chapter") module 410 uses one or more presently available computing and text-to-speech techniques to generate and play the response, then resumes the narration if appropriate to the detected voice command. Other narration control gestures, audio inputs, pointing device inputs, and text inputs, along with corresponding responses, are also possible and contemplated within the scope of the illustrative embodiments.

Figure 5:
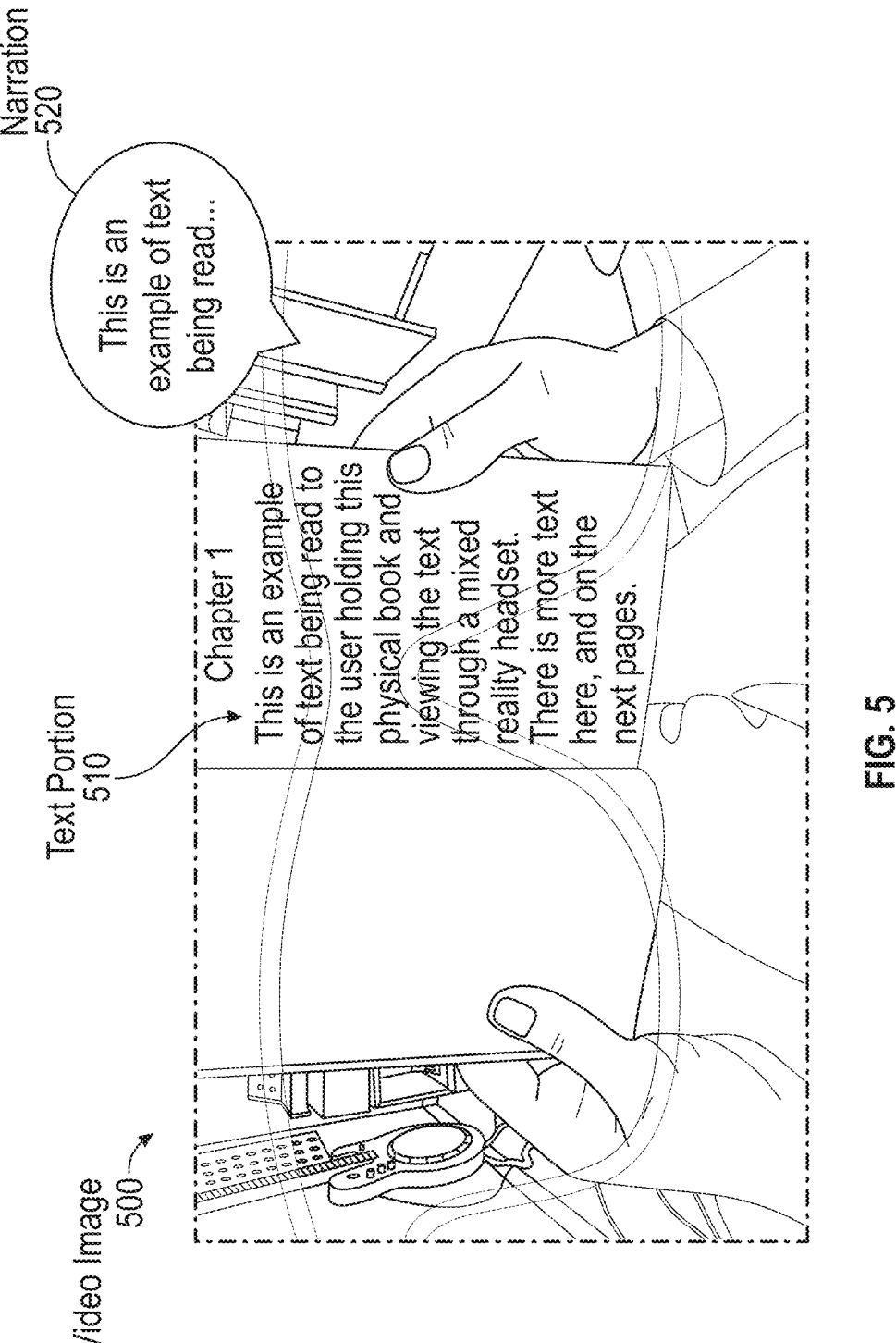
FIG. 5 depicts an example of mixed reality text narration control, in accordance with an illustrative embodiment.

FIG. 5 depicts an example of mixed reality text narration control, in accordance with an illustrative embodiment. The example can be executed using application 222 in FIG. 2.

Video image 500 depicts a user holding a physical book at a first time, as seen through an MR headset such as mixed reality HMD 352 in FIG. 3. Text portion 510 is a text portion in the physical book, and narration 520 is the corresponding audio narration.

Figure 6:
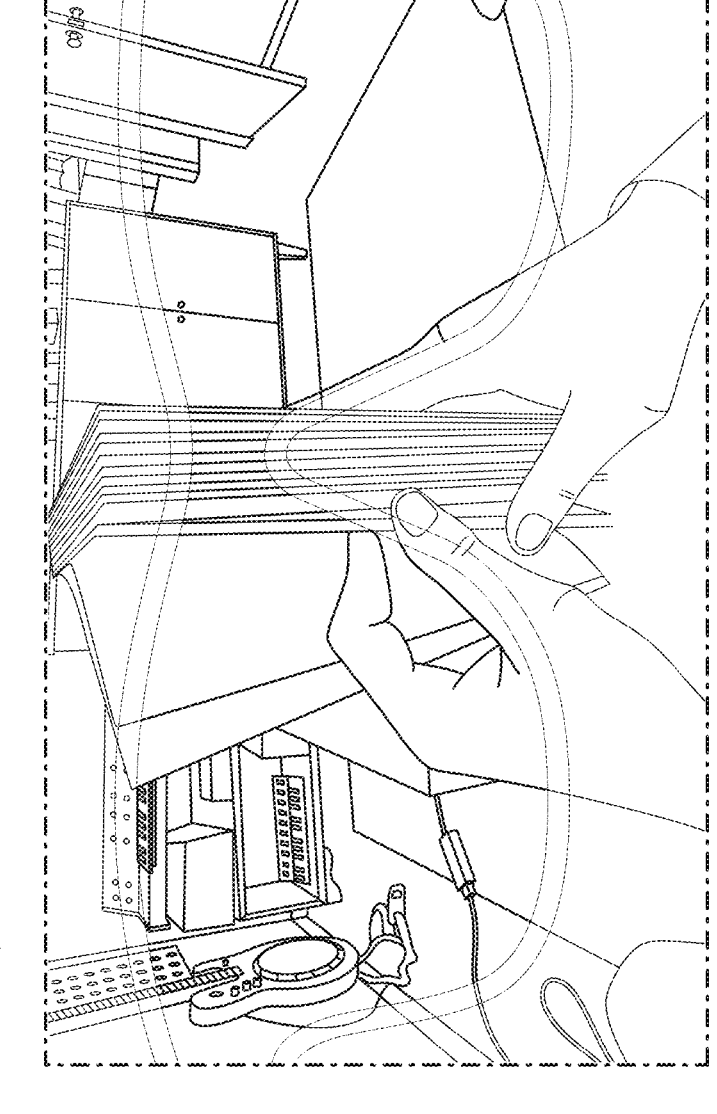
FIG. 6 depicts a continued example of mixed reality text narration control, in accordance with an illustrative embodiment.

FIG. 6 depicts a continued example of mixed reality text narration control, in accordance with an illustrative embodiment.

Video image 600 depicts a user holding a physical book at a second time later than the first time of video image 500, as seen through an MR headset such as mixed reality HMD 352 in FIG. 3. Text portion 510 is no longer visible, as the user is changing to a different page, and narration 520 is no longer occurring.

Figure 7:
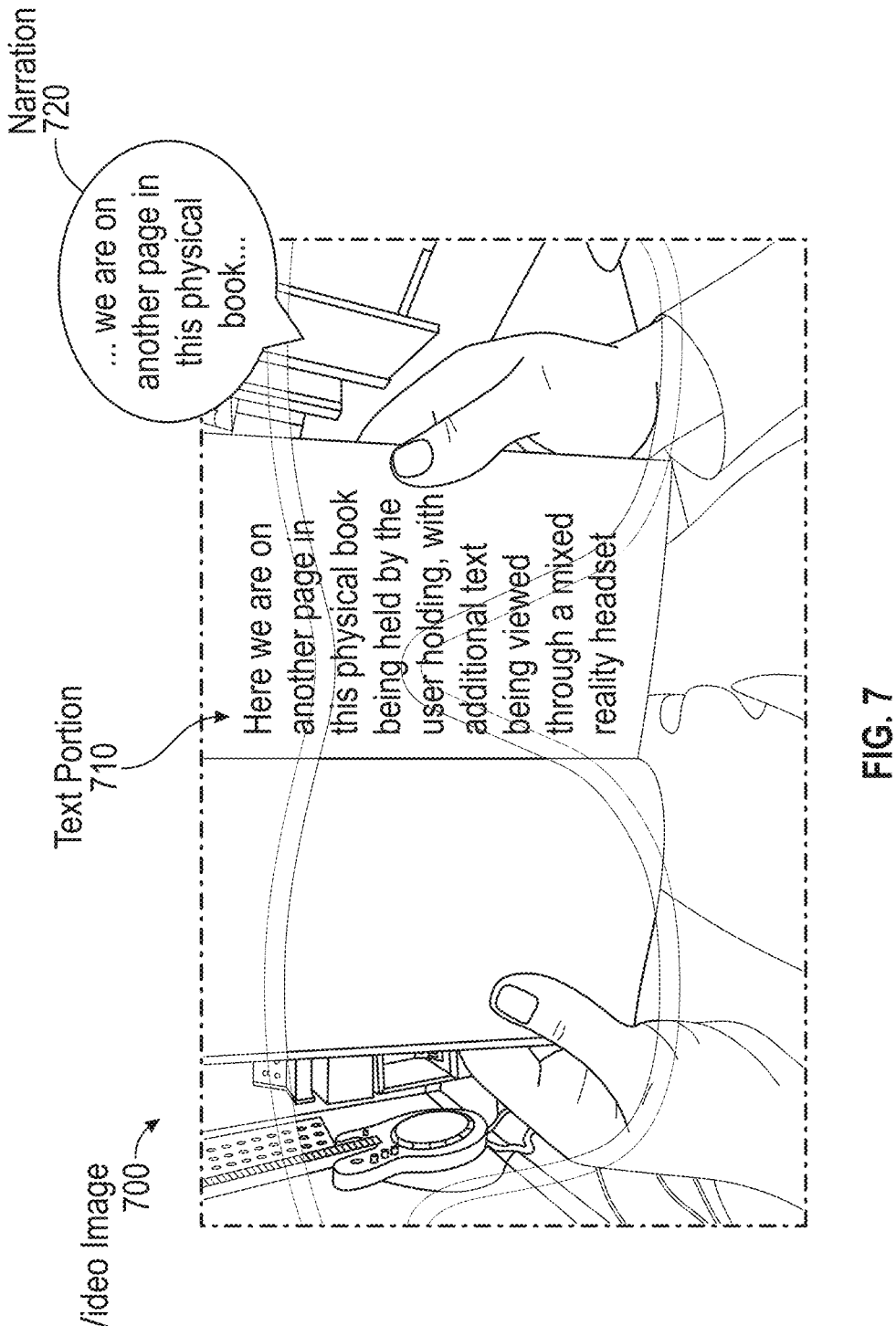
FIG. 7 depicts a continued example of mixed reality text narration control, in accordance with an illustrative embodiment.

FIG. 7 depicts a continued example of mixed reality text narration control, in accordance with an illustrative embodiment.

Video image 700 depicts a user holding a physical book at a third time later than the second time of video image 600, as seen through an MR headset such as mixed reality HMD 352 in FIG. 3. Text portion 710 is now longer visible, and narration 720 is the corresponding audio narration.

FIG. 8 depicts a flowchart of an example process for mixed reality text narration control, in accordance with an illustrative embodiment. Process 800 can be implemented in application 222 in FIG. 2.

At block 802, the process receives, via a video camera of a mixed reality headset, a first video frame comprising a first text portion. At block 804, the process narrates the first text portion, the narration comprising converting, using a trained text-to-speech conversion model, the first text portion to corresponding audio. At block 806, the process detects, in a second video frame received via the video camera, during the narrating, that the first text portion has been replaced by a second text portion. At block 808, the process adjusts, responsive to the detecting, the narrating, the adjusting comprising ceasing the narrating at a first word in the first text portion and starting the narrating at a second word in the second text portion. Then the process ends.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more embodiments, the computer-readable media is non-transitory computer-readable media, computer-readable storage media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims or clauses, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims or clauses that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user.

Method claims or clauses may be provided to present elements of the various steps, operations, or processes in a sample order, and are not meant to be limited to the specific order or hierarchy presented.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims or clauses are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

The invention claimed is:

1. A computer-implemented method comprising:
receiving a first video frame via a video camera of a mixed reality headset, wherein the first video frame comprises a first text portion;
providing the first text portion to a trained text-to-speech (TTS) model;
receiving a first audio corresponding to the first text portion from the TTS model;
narrating the first text portion based on the first audio;
while narrating the first text portion, (i) receiving a second video frame via the video camera, wherein the second video frame comprises a second text portion and (ii) determining that the first text portion has been replaced by the second text portion in a field of view of the mixed reality headset;

responsive to determining that the first text portion has been replaced by the second text portion, stopping narration of the first text portion;
providing the second text portion to the TTS model;
receiving a second audio corresponding to the second text portion from the TTS model;
after stopping narration of the first text portion, narrating the second text portion based on the second audio;
while narrating the second text portion, (i) receiving a third video frame via the video camera and (ii) determining based on the third video frame that the field of view is directed away from the second text portion; and
responsive to determining that the field of view is directed away from the second text portion, pausing narration of the second text portion.

2. The computer-implemented method of claim 1, further comprising:
determining that the second text portion has been in view of the video camera for a predetermined amount of time;
wherein stopping narration of the first text portion is performed responsive to determining that the second text portion has been in view of the video camera for the predetermined amount of time.

3. The computer-implemented method of claim 1, further comprising:
while narrating the first text portion, detecting a first gesture indicating a particular word in the first text portion; and
responsive to detecting the first gesture, (i) pausing narration of the first text portion and resuming narration of the first text portion at the particular word, or (ii) adjusting an appearance of the particular word in a display of the mixed reality headset.

4. The computer-implemented method of claim 1, further comprising:
while narrating the first text portion, detecting a second gesture; and
responsive to detecting the second gesture, adjusting a narration speed of the first text portion.

5. The computer-implemented method of claim 1, further comprising:
prior to providing the first text portion to the TTS model, translating the first text portion from a first human language to a second human language;
wherein the first audio is in the second human language.

6. The computer-implemented method of claim 1, further comprising:
while narrating the first text portion, determining an eye gaze location indicating a particular word in the first text portion; and
responsive to detecting the eye gaze location, pausing narration of the first text portion and resuming narration of the first text portion at the particular word.

7. The computer-implemented method of claim 1, further comprising:
while narrating the first text portion, detecting an audio input;
recognizing the audio input as a voice command with a trained speech-recognition model; and
responsive to the voice command, adjusting narration of the first text portion.

8. The computer-implemented method of claim 1, wherein stopping narration of the first text portion is performed prior to completing narration of the first text portion.

9. The computer-implemented method of claim 1, wherein pausing narration of the second text portion is performed prior to completing narration of the second text portion.

10. A non-transitory, computer-readable medium storing instructions, which when executed by a processor of an electronic device, cause the electronic device to:

receive a first video frame via a video camera of a mixed reality headset, wherein the first video frame comprises a first text portion;

provide the first text portion to a trained TTS model;

receive a first audio corresponding to the first text portion from the TTS model;

narrate the first text portion based on the first audio;

while narrating the first text portion, (i) receive a second video frame via the video camera, wherein the second video frame comprises a second text portion and (ii) determine that the first text portion has been replaced by the second text portion in a field of view of the mixed reality headset;

responsive to determining that the first text portion has been replaced by the second text portion, stop narration of the first text portion;

provide the second text portion to the TTS model;

receive a second audio corresponding to the second text portion from the TTS model;

after stopping narration of the first text portion, narrate the second text portion based on the second audio;

while narrating the second text portion, (i) receive a third video frame via the video camera and (ii) determine based on the third video frame that the field of view is directed away from the second text portion; and responsive to determining that the field of view is directed away from the second text portion, pause narration of the second text portion.

11. The non-transitory, computer-readable medium of claim 10, wherein the instructions further cause the electronic device to:

determine that the second text portion has been in view of the video camera for a predetermined amount of time;

wherein stopping narration of the first text portion is performed responsive to determining that the second text portion has been in view of the video camera for the predetermined amount of time.

12. The non-transitory, computer-readable medium of claim 10, wherein the instructions further cause the electronic device to:

while narrating the first text portion, detect a first gesture indicating a particular word in the first text portion; and responsive to detecting the first gesture, (i) pause narration of the first text portion and resume narration of the first text portion at the particular word, or (ii) adjust an appearance of the particular word in a display of the mixed reality headset.

13. The non-transitory, computer-readable medium of claim 10, wherein the instructions further cause the electronic device to:

while narrating the first text portion, detect a second gesture; and responsive to detecting the second gesture, adjust a narration speed of the first text portion.

14. The non-transitory, computer-readable medium of claim 10, wherein the instructions further cause the electronic device to:

prior to providing the first text portion to the TTS model, translate the first text portion from a first human language to a second human language;

wherein the first audio is in the second human language.

15. The non-transitory, computer-readable medium of claim 10, wherein the instructions further cause the electronic device to:

while narrating the first text portion, determine an eye gaze location indicating a particular word in the first text portion; and responsive to detecting the eye gaze location, pause narration of the first text portion and resume narration of the first text portion at the particular word.

16. The non-transitory, computer-readable medium of claim 10, wherein stopping narration of the first text portion is performed prior to completing narration of the first text portion.

17. The non-transitory, computer-readable medium of claim 10, wherein pausing narration of the second text portion is performed prior to completing narration of the second text portion.

18. A system comprising:

a processor; and a non-transitory, computer-readable medium storing instructions, which when executed by the processor, cause the system to:

receive a first video frame via a video camera of a mixed reality headset, wherein the first video frame comprises a first text portion;

provide the first text portion to a trained TTS model;

receive a first audio corresponding to the first text portion from the TTS model;

narrate the first text portion based on the first audio;

while narrating the first text portion, (i) receive a second video frame via the video camera, wherein the second video frame comprises a second text portion and (ii) determine that the first text portion has been replaced by the second text portion in a field of view of the mixed reality headset;

responsive to determining that the first text portion has been replaced by the second text portion, stop narration of the first text portion;

provide the second text portion to the TTS model;

receive a second audio corresponding to the second text portion from the TTS model;

after stopping narration of the first text portion, narrate the second text portion based on the second audio;

while narrating the second text portion, (i) receive a third video frame via the video camera and (ii) determine based on the third video frame that the field of view is directed away from the second text portion; and responsive to determining that the field of view is directed away from the second text portion, pause narration of the second text portion.

* * * * *